US012572816B2

(12) United States Patent
Sharpe et al.

(10) Patent No.: US 12,572,816 B2
(45) Date of Patent: Mar. 10, 2026

(54) MONITORING MACHINE LEARNING MODELS USING SURROGATE MODEL OUTPUT

(71) Applicant: Capital One Services, LLC, McLean, VA (US)

(72) Inventors: Samuel Sharpe, Cambridge, MA (US); Christopher Bayan Bruss, Washington, DC (US); Brian Barr, Schenectady, NY (US); Justin Au-Yeung, Somerville, MA (US)

(73) Assignee: Capital One Services, LLC, McLean, VA (US)

( * ) Notice: Subject to any disclaimer, the term of this patent is extended or adjusted under 35 U.S.C. 154(b) by 725 days.

(21) Appl. No.: 18/045,746

(22) Filed: Oct. 11, 2022

(65) Prior Publication Data

US 2024/0119303 A1 Apr. 11, 2024

(51) Int. Cl.
*G06F 7/00* (2006.01)
*G06N 3/045* (2023.01)
*G06N 3/096* (2023.01)

(52) U.S. Cl.
CPC ............. *G06N 3/096* (2023.01); *G06N 3/045* (2023.01)

(58) Field of Classification Search
CPC .............................. G06N 3/096; G06N 3/045
USPC ..................................... 707/600–899; 706/20
See application file for complete search history.

(56) References Cited

U.S. PATENT DOCUMENTS

2024/0202405 A1* 6/2024 Lang ...................... G06F 30/27

* cited by examiner

*Primary Examiner* — Isaac M Woo
(74) *Attorney, Agent, or Firm* — Foley & Lardner LLP

(57) ABSTRACT

In some aspects, a computing system may use a surrogate machine learning model to detect whether a production or other machine learning model has a tendency to generate different output depending on which subpopulation a particular sample belongs to. The surrogate machine learning model may be trained using features/outputs that are not included in the data used by the production model. For example, by using demographic information in lieu of the original labels of a dataset that was used to train a production model, a surrogate model may be used to detect whether the production model is able to discern one or more characteristics associated with but not present in a sample using other features of the dataset. Output of the surrogate machine learning model may be clustered to detect whether certain subpopulations are treated differently by the production model.

20 Claims, 4 Drawing Sheets

400

100

<u>400</u>

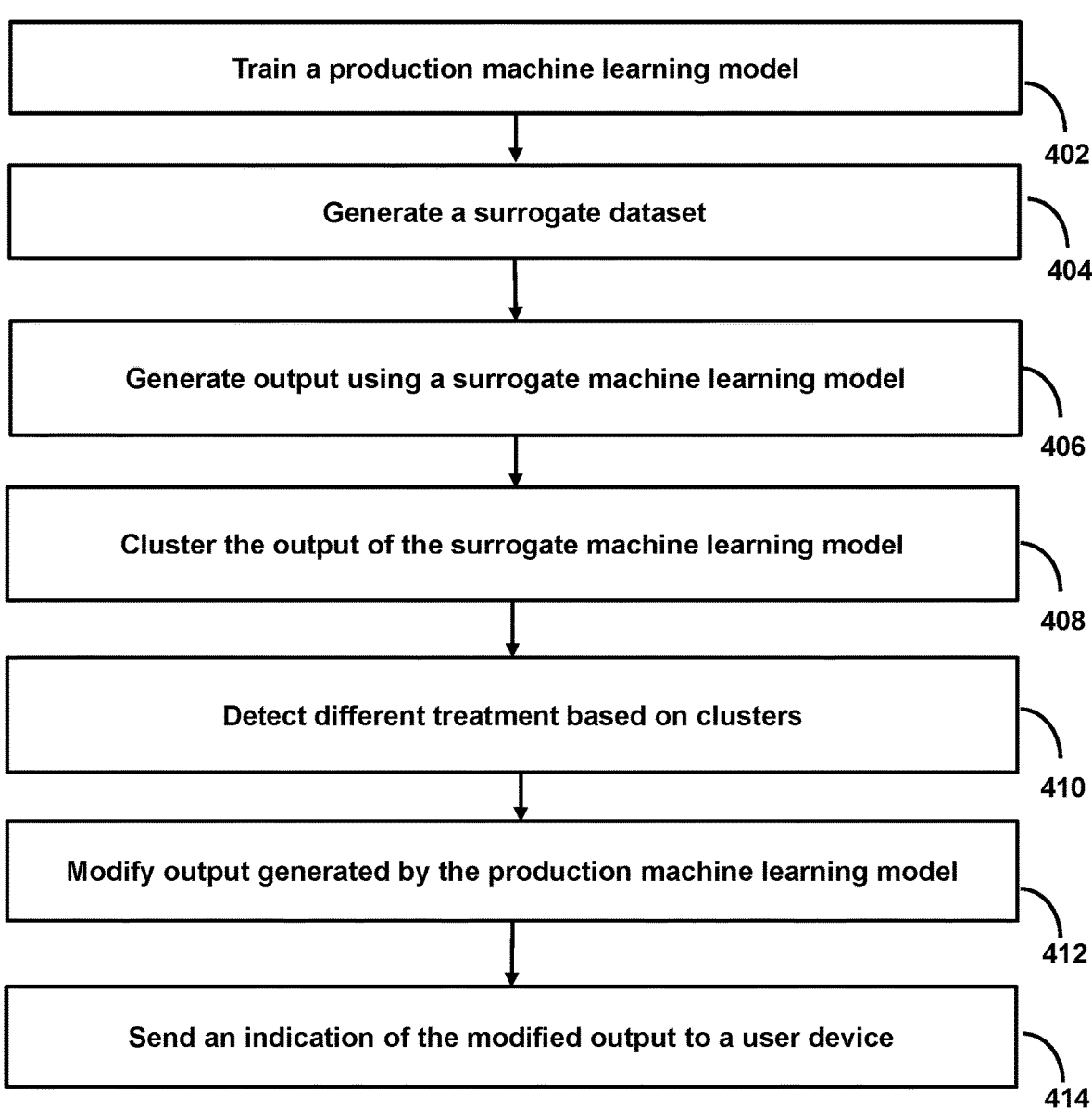

Train a production machine learning model

402

Generate a surrogate dataset

404

Generate output using a surrogate machine learning model

406

Cluster the output of the surrogate machine learning model

408

Detect different treatment based on clusters

410

Modify output generated by the production machine learning model

412

Send an indication of the modified output to a user device

MONITORING MACHINE LEARNING MODELS USING SURROGATE MODEL OUTPUT

SUMMARY

A machine learning model may be monitored to detect and resolve any issues that may have arisen in connection with the model. For example, a machine learning model may be monitored to prevent model drift, maintain model performance, or maintain data quality. One problem with existing machine learning monitoring systems is that they are unable to target a model's treatment of a particular value of a feature to determine whether the model is treating samples with the particular value differently from samples that have other values of the feature. In other words, existing systems may be unable to determine whether a model is treating a first subpopulation or group differently from a second subpopulation or group. For example, existing systems may be unable to determine whether users of a first demographic are treated differently (e.g., with more positive outcomes or output of a model) as compared to users of a second demographic.

To address these issues, non-conventional methods and systems described herein may use a surrogate machine learning model to detect whether a production or other machine learning model has a tendency to generate different output depending on which subpopulation a particular sample belongs to. The surrogate machine learning model may be trained using features/outputs that are not included in the data used by the production model. For example, by using labels associated with demographic information in place of the original labels of a dataset that were used to train a production model, a surrogate model may be used to detect whether the production model is able to discern one or more characteristics associated with but not present in a sample using other features of the dataset. Output of the surrogate machine learning model may be clustered to detect whether certain subpopulations are treated differently by the production model. By doing so, a computing system may detect and correct output of the machine learning model to prevent inconsistent treatment between different subpopulations.

In some aspects, a computing system may generate a surrogate dataset for training a surrogate machine learning model such that: (i) the surrogate dataset is a modified version of a production training dataset used to train a production machine learning model to classify an input with a respective label of a production set of labels included in the production training dataset; and (ii) the surrogate dataset comprises a surrogate set of labels in lieu of the production set of labels of the production training dataset. The surrogate set of labels may have not been included in the production training dataset and may have not been used to train the production model. The computing system may use the surrogate dataset to train the surrogate machine learning model to classify an input with a respective label of the surrogate set of labels. The computing system may obtain production inputs and production outputs of the production machine learning model. Each production output of the production outputs may include a respective label of the production set of labels that was generated via the production machine learning model in response to providing the production machine learning model with a corresponding production input. The computing system may provide, to the surrogate machine learning model trained on the surrogate dataset, the production inputs to obtain surrogate outputs. Each surrogate output may include (i) a label of the surrogate set of labels and (ii) a confidence score for the label. The computing system may perform clustering based on confidence scores of the surrogate outputs to determine one or more clusters indicating a threshold-exceeding correlation between (i) a respective label of the surrogate set of labels, (ii) a respective label of the production set of labels, and (iii) one or more respective feature values of features of the production inputs. The computing system may generate, based on the one or more clusters, an indication of a modification related to the production machine learning model.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 4 shows a flowchart of the steps involved in using a surrogate model to monitor a machine learning model, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
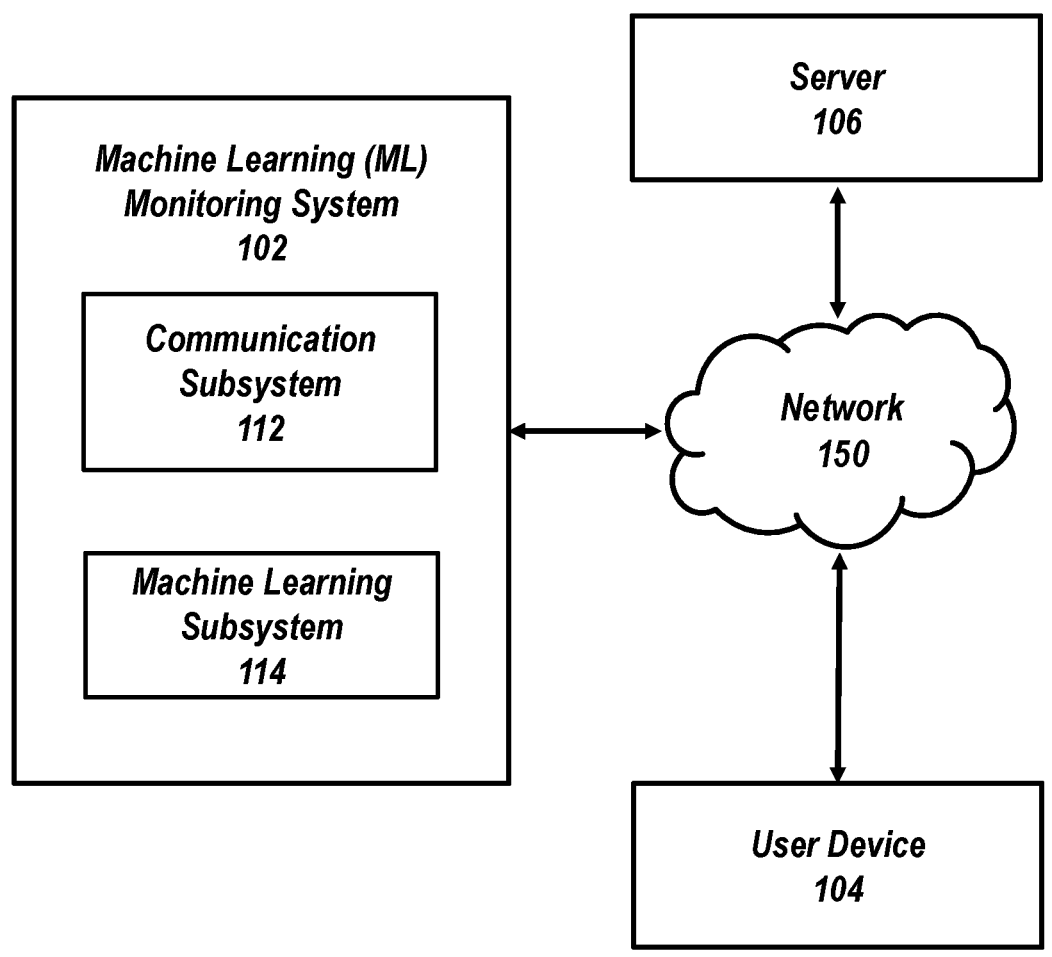
FIG. 1 shows an illustrative diagram for monitoring machine learning models, in accordance with one or more embodiments.

FIG. 1 shows an illustrative system 100 for monitoring machine learning models. The system 100 includes a machine learning (ML) monitoring system 102, a server 106, and a user device 104 that may communicate with each other via a network 150. The ML monitoring system 102 may include a communication subsystem 112, a machine learning subsystem 114, or other components.

The ML monitoring system 102 may train a production machine learning model. For example, the ML monitoring system 102 may train, using a production dataset and via the machine learning subsystem 114, a production machine learning model to classify input based on a first set of labels. As used herein, a production machine learning model may include a variety of machine learning models (e.g., as described below in connection with FIG. 3). A production machine learning model may be a machine learning model that has been deployed to a production environment (e.g., that is accessible to the public, that is used by one or more systems or customers, etc.). The production dataset may include a plurality of features and the first set of labels. As referred to herein, a "feature" may be an individual measurable property or characteristic of a phenomenon. For example, features used to predict whether a user should be approved for a banking product may include income of the user, occupation of the user, credit history of the user, or zip code of the user. A label may be a target output for a machine learning model. A label may be used by the machine learning model to learn. In one example, a label of 0 may indicate that a user should not be approved for a banking product (e.g., a loan, a credit card, etc.) while a label of 1 may indicate that a user should be approved for a banking product.

By training the production machine learning model, the ML monitoring system 102 may be able to perform a variety of tasks using the production machine learning model. For example, the production machine learning model may be used to generate output indicating whether a particular user should be approved for a banking product. A banking product may include a loan, a credit or debit card, a bank account, or a variety of other banking products. In some embodiments, the computing system may use the production machine learning model to determine whether to approve a loan, issue a credit card or debit card, open an account (e.g., a checking account, a savings account, or a money market account), increase a credit limit, issue a certificate of deposit (CD), process a mortgage, or a variety of other banking related actions.

As described in more detail below, the ML monitoring system 102 may use a surrogate machine learning model to detect whether the production machine learning model has a tendency to generate different output depending on which subpopulation a particular sample belongs to. The surrogate machine learning model may be trained using features/ outputs that are not included in the data used by the production model. For example, by using labels associated with demographic information in place of the original labels of a dataset that were used to train a production model, a surrogate model may be used to detect whether the production model is able to discern one or more characteristics associated with but not present in a sample using other features of the dataset.

The ML monitoring system 102 may generate a surrogate dataset. A surrogate dataset may include a variety of datasets used in connection with a surrogate machine learning model (e.g., to train a surrogate machine learning model). A surrogate dataset may include the same data (e.g., the same samples, feature values, features, etc.) as a production dataset, but may have different labels for each sample. For example, the ML monitoring system 102 may generate a surrogate dataset by replacing the labels in the production dataset with a second set of labels. The second set of labels may correspond to features that were not used in the production dataset. For example, the production model may have not been trained using the second set of labels and the second set of labels may have not been included as features in the dataset used to train the production model. The surrogate dataset may be a modified version of a production training dataset used to train a production machine learning model to classify an input with a respective label of a production set of labels included in the production training dataset. For example, the surrogate dataset may be the same as the production training dataset, except that the labels may be different. In one example, the labels in the production training dataset may indicate whether a user was associated with a fraudulent transaction and the labels in the surrogate dataset may indicate an income level of the user. In this example, the features and values other than what is contained in the labels may be the same for the production training dataset and the surrogate dataset.

By generating a surrogate dataset, the ML monitoring system 102 may be able to train a surrogate machine learning model that can be used to identify different treatment in subpopulations (e.g., bias) in output generated by the production model. A surrogate machine learning model may be a variety of models including any model described below in connection with FIG. 3. A surrogate machine learning model may be a model that is trained using a variation of the data that is used to train a production machine learning model. The replacement labels may be any feature for which the ML monitoring system 102 would like to test for bias. For example, if the original labels correspond to whether a user should be approved for a banking product and the replacement labels correspond to gender, the ML monitoring system 102 may be able to detect whether the production model is biased toward approving banking products for a particular gender, as explained in more detail below.

The ML monitoring system 102 may generate output using a surrogate machine learning model. The ML monitoring system 102 may provide the surrogate model with the production inputs to obtain surrogate outputs. Each surrogate output may correspond to output of the production model. For example, for each instance of a production dataset, the production model may generate a classification. The surrogate model may do likewise (e.g., generate a classification) for each instance of a surrogate dataset. Each instance of the surrogate dataset may be the same as a corresponding instance of the production dataset except for differing labels. For example, the label for an instance of the production dataset may correspond to whether a user should be approved for a banking product, and a label for the corresponding instance in the surrogate dataset may correspond to demographic information of the user.

The ML monitoring system 102 may use the surrogate dataset to train the surrogate machine learning model to classify an input with the respective label of the surrogate set of labels. For example, the ML monitoring system 102 may use the surrogate dataset to train the surrogate machine learning model to generate a prediction of demographic information associated with a user, each surrogate output of the surrogate outputs comprising (i) a respective surrogate label of the surrogate set of labels and (ii) a confidence score for the respective surrogate label.

The ML monitoring system 102 may cluster the output of the surrogate machine learning model. For example, the ML monitoring system 102 may determine, based on the output of the surrogate machine learning model, a plurality of clusters. In some embodiments, the ML monitoring system 102 may determine clusters based on confidence scores associated with the output of the surrogate machine learning model. For example, output that is above a threshold confidence score may be assigned to a first cluster and output that is below the threshold confidence score may be assigned to a second cluster. In one example, the ML monitoring system 102 may determine one or more clusters by separating each classification of the second outputs based on a threshold confidence score, wherein confidence scores of a first cluster of the one or more clusters are below the threshold confidence score and confidence scores of a second cluster of the one or more clusters are above the threshold confidence score. In some embodiments, the ML monitoring system 102 may determine clusters using one or more machine learning models. For example, the ML monitoring system 102 may use K-means, means-shift, density-based spatial clustering of applications with noise (DB-SCAN), or a variety of other clustering techniques to determine clusters.

Figure 2:
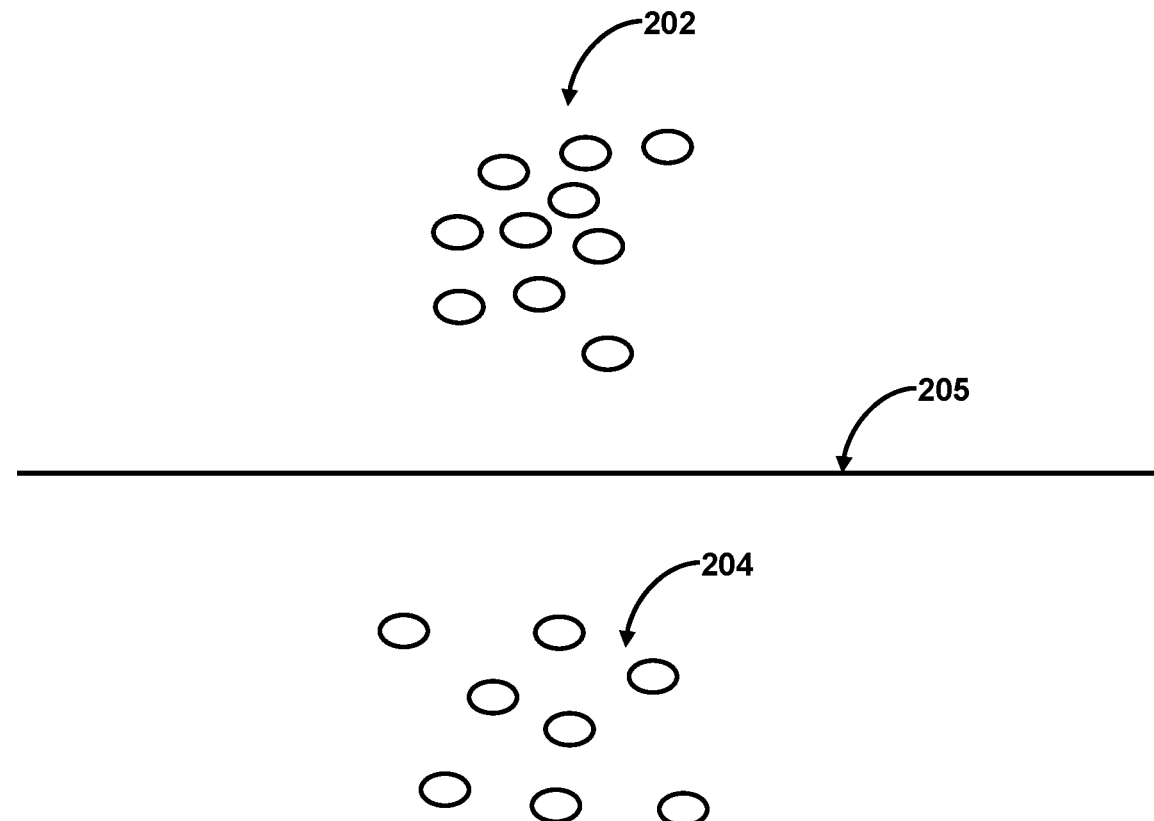
FIG. 2 shows example clusters of surrogate model output that may be used for monitoring machine learning models, in accordance with one or more embodiments.

Referring to FIG. 2, example clusters generated by the ML monitoring system 102 are shown. In this example, cluster 202 and cluster 204 are separated based on a threshold boundary designation 205. The samples in cluster 202 may be associated with a high confidence score (e.g., higher than a threshold confidence score) and the samples in cluster 204 may be associated with a low confidence score (e.g., lower than a threshold confidence score). The threshold boundary designation 205 may correspond to a threshold confidence score. For example, the cluster 202 may include samples for which a correct classification was generated by the surrogate machine learning model with a confidence score greater than the threshold confidence score (e.g., greater than about 0.7, 0.8, 0.9 etc.). The cluster 204 may include samples for which a classification was generated by the surrogate machine learning model with a confidence score less than the threshold confidence score. Because the cluster 202 is associated with a high confidence score (e.g., greater than the threshold confidence score), the ML monitoring system 102 may determine that the production machine learning model may be able to infer the label in the surrogate dataset and use it to influence the output the production machine learning model generates (e.g., even though the label/feature is not included in the production dataset). The ML monitoring system 102 may then identify whether the production model is treating one cluster differently from the other. For example, if the production machine learning model tends to approve users associated with the cluster 204 for a banking product more often (e.g., often enough that it is statistically significant) than users that are part of cluster 202, the ML monitoring system 102 may determine that the production model may be biased with respect to the label in the surrogate dataset. The ML monitoring system 102 may modify output of the production machine learning model to counteract the bias. For example, the ML monitoring system 102 may cause more users associated with the cluster 202 to be approved for a banking product. In some embodiments, the boundary designation may be curved or multidimensional.

By clustering output of the surrogate machine learning model, the ML monitoring system 102 may be able to determine whether the surrogate machine learning model is able to make accurate classifications for one or more samples. The ML monitoring system 102 may then determine whether the production machine learning model is treating those one or more samples differently from other samples that the surrogate machine learning model is unable to accurately classify. If the production machine learning model is treating those one or more samples differently, the ML monitoring system 102 may determine that the production model is biased and may modify output of the production model to counteract the bias as explained in more detail below.

The ML monitoring system 102 may detect that the production model treats different subpopulations differently based on the clusters. Different treatment of subpopulations by a machine learning model may arise because the model is able to infer one or more characteristics about a sample even though the one or more characteristics is not explicitly present in the sample. For example, despite a feature not being present in a dataset, the machine learning model may be able to use other features to make inference as if the feature was present. This may lead to bias or unfair outcomes for particular subgroups that contain the inferred feature.

In some embodiments, the ML monitoring system 102 may detect different treatment based on correlation (e.g., unintended correlation) of output associated with one or more clusters. For example, the ML monitoring system 102 may perform clustering based on confidence scores of the surrogate outputs to determine one or more clusters indicating a threshold-exceeding correlation between (i) a respective label of the surrogate set of labels, (ii) a respective label of the production set of labels, and (iii) one or more respective feature values of features of the production inputs. In one example, the ML monitoring system 102 may determine that there is a high correlation between being rejected for a banking product and being a member of a cluster for which the surrogate machine learning model has higher than a threshold confidence score for classifying as belonging to one or more demographics. The correlation may indicate bias in the production machine learning model. The bias may be associated with the set of labels used to replace the labels used in training the production machine learning model.

In some embodiments, the ML monitoring system 102 may determine that the production machine learning model is providing different treatment (e.g., different output) to different subpopulations based on detecting an anomalous cluster. The ML monitoring system 102 may detect, based on the plurality of clusters and via an anomaly detection model, an anomalous cluster of the plurality of clusters, wherein the anomalous cluster indicates bias in the production machine learning model, the bias being associated with the feature not present in the production dataset. In one example, detecting an anomalous cluster may include determining that the production machine learning model outputs more than a threshold number of classifications of a first type for the first cluster and outputs fewer than the threshold number of classifications of the first type for the second cluster; and based on the production machine learning model outputting more than the threshold number of classifications of the first type for the first cluster and outputting fewer than the threshold number of classifications of the first type for the second cluster, determining that the first cluster is anomalous. Detecting an anomalous cluster may indicate that any members or users associated with the anomalous cluster are being treated differently by the production machine learning model. By detecting an anomalous cluster, the ML monitoring system 102 may be able to determine that output of the production model (e.g., for other samples that may be members of the cluster) should be modified. By doing so, the ML monitoring system 102 may be able to provide more consistent output, which may improve the functioning of the ML monitoring system 102 by providing more predictable outcomes.

The ML monitoring system 102 may modify output generated by the production machine learning model. For example, the ML monitoring system 102 may generate, based on the one or more clusters, an indication of a modification related to the first machine learning model. In some embodiments, the ML monitoring system 102 may modify output generated by the production machine learning model to counteract potential bias of the production machine learning model. For example, the ML monitoring system 102 may determine that a user is associated with a demographic that has been denied banking products via the production machine learning model (e.g., based on the user belonging to a cluster that has been determined to be anomalous, based on the user belonging to a cluster that has been determined to be treated differently by the production machine learning model as compared to users belonging to other clusters, etc.). The ML monitoring system 102 may send an indication of the modified output to the user device 104 or the server 106. For example, the ML monitoring system 102 may send the modified output to a user that has been approved for a banking product.

Figure 3:
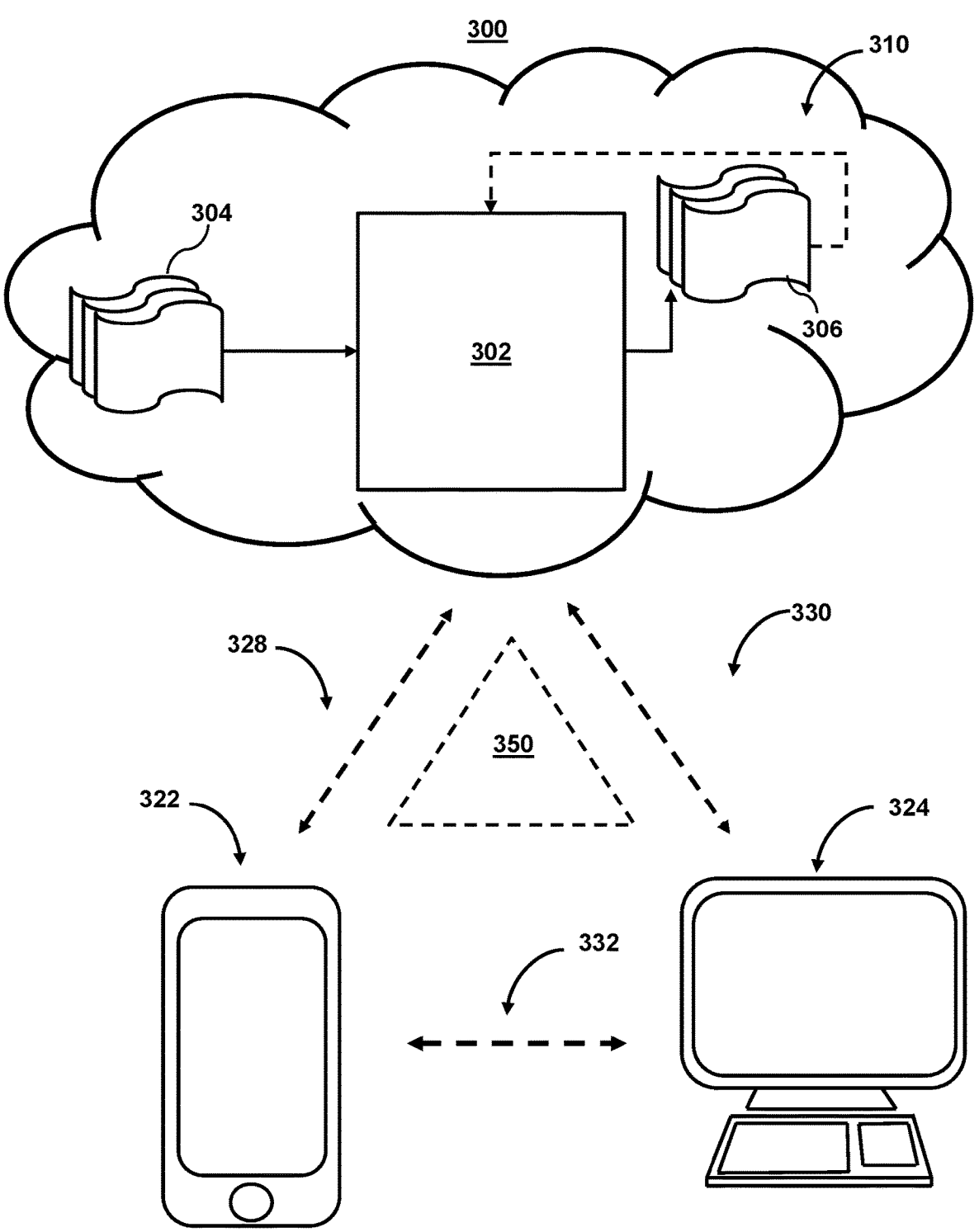
FIG. 3 shows illustrative components for a system that may be used for monitoring machine learning models, in accordance with one or more embodiments.

FIG. 3 shows illustrative components for a system 300 that may be used for configuration of machine learning models for different purposes (e.g., to monitor machine learning models, to detect whether a machine learning model is treating different subpopulations differently, for example, as described in connection with FIGS. 1, 2, and 4), in accordance with one or more embodiments. The components shown in system 300 may be used to perform any of the functionality described above in connection with FIG. 1. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a handheld computer, and other computer equipment (e.g., a server), including "smart," wireless, wearable, mobile devices, and/or any device or system described in connection with FIGS. 1, 2, and 4. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., data related to monitoring machine learning models or related to detecting whether a machine learning model is treating different subpopulations differently, for example, as described in connection with FIGS. 1, 2, and 4).

Additionally, as mobile device 322 and user terminal 324 are shown as a touchscreen smartphone and a personal computer, these displays also act as user input interfaces. It should be noted that in some embodiments, the devices may have neither user input interfaces nor displays and may instead receive and display content using another device (e.g., a dedicated display device, such as a computer screen and/or a dedicated input device such as a remote control, mouse, voice input, etc.). Additionally, the devices in system 300 may run an application (or another suitable program). The application may cause the processors and/or control circuitry to perform operations related to monitoring machine learning models or related to detecting whether a machine learning model is treating different subpopulations differently, for example, as described in connection with FIGS. 1, 2, and 4.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy disk drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or Long-Term Evolution (LTE) network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices. Cloud components 310 may include the ML monitoring system 102 or the user device 104 described in connection with FIG. 1.

Cloud components 310 may include model 302, which may be a machine learning model, artificial intelligence model, etc. (which may be collectively referred to herein as "models"). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., to monitor machine learning models, or detect whether a machine learning model is treating different subpopulations differently, for example, as described in connection with FIGS. 1, 2, and 4).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

In some embodiments, the model (e.g., model 302) may automatically perform actions based on outputs 306. In some embodiments, the model (e.g., model 302) may not perform any actions. The model (e.g., model 302) may be used to determine whether to modify output of a production machine learning model, monitor machine learning models, or detect whether a machine learning model is treating different subpopulations differently, for example, as described in connection with FIGS. 1, 2, and 4 as described above in connection with FIGS. 1, 2, and 4.

System 300 also includes application programming interface (API) layer 350. API layer 350 may allow the system to generate summaries across different devices. In some embodiments, API layer 350 may be implemented on user device 322 or user terminal 324. Alternatively, or additionally, API layer 350 may reside on one or more of cloud components 310. API layer 350 (which may be a representational state transfer (REST) or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. Simple Object Access Protocol (SOAP) web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer, where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying web application firewall (WAF) and distributed denial-of-service (DDoS) protection, and API layer 350 may use RESTful APIs as standard for external integration.

FIG. 4 shows a flowchart of the steps involved in using a surrogate model to monitor a machine learning model, in accordance with one or more embodiments. Although described as being performed by a computing system, one or more actions described in connection with process 400 of FIG. 4 may be performed by one or more devices shown in FIGS. 1-3. The processing operations presented below are intended to be illustrative and non-limiting. In some embodiments, for example, the method may be accomplished with one or more additional operations not described, or without one or more of the operations discussed. Additionally, the order in which the processing operations of the methods are illustrated (and described below) is not intended to be limiting.

At step 402, a computing system may train a production machine learning model. For example, the computing system may train, using a production dataset, a production machine learning model to classify input based on a first set of labels. The production dataset may include a plurality of features and the first set of labels. By doing so, the computing system may be able to perform a variety of tasks using the production machine learning model. For example, the production machine learning model may be used to generate output indicating whether a particular user should be approved for a banking product (e.g., a banking product described above in connection with FIG. 1).

At step 404, the computing system may generate a surrogate dataset. For example, the computing system may generate a surrogate dataset by replacing the labels in the production dataset with a second set of labels. The second set of labels may correspond to features that were not used in the production dataset. For example, the production model may have not been trained using the second set of labels and the second set of labels may have not been included as features in the dataset used to train the production model. The surrogate dataset may be a modified version of a production training dataset used to train a production machine learning model to classify an input with a respective label of a production set of labels included in the production training dataset. By generating a surrogate dataset, the computing system may be able to train a surrogate machine learning model that can be used to identify bias in output generated by the production model. In particular, the replacement labels can be any feature that the computing system would like to test for bias. For example, if the original labels correspond to whether a user should be approved for a banking product and the replacement labels correspond to gender, the computing system may be able to detect whether the production model is biased toward approving banking products for a particular gender as explained in more detail below.

At step 406, the computing system may generate output using a surrogate machine learning model. The computing system may provide the surrogate model with the production inputs to obtain surrogate outputs. Each surrogate output may correspond to output of the production model. For example, for each instance of a production dataset, the production model may generate a classification. The surrogate model may do likewise (e.g., generate a classification) for each instance of a surrogate dataset. Each instance of the surrogate dataset may be the same as a corresponding instance of the production dataset except for differing labels. For example, the label for an instance of the production dataset may correspond to whether a user should be approved for a banking product and a label for the corresponding instance in the surrogate dataset may correspond to demographic information of the user.

The computing system may use the surrogate dataset to train the surrogate machine learning model to classify an input with a respective label of the surrogate set of labels. For example, the computing system may use the surrogate dataset to train the surrogate machine learning model to generate a prediction of demographic information associated with a user. each surrogate output of the surrogate outputs comprising (i) a respective surrogate label of the surrogate set of labels and (ii) a confidence score for the respective surrogate label.

At step 408, the computing system may cluster the output of the surrogate machine learning model. For example, the computing system may determine, based on the output of the surrogate machine learning model, a plurality of clusters. In some embodiments, the computing system may determine clusters based on confidence scores associated with the output of the surrogate machine learning model. For example, output that is above a threshold confidence score may be assigned to a first cluster and output that is below the threshold confidence score may be assigned to a second cluster. In one example, the computing system may determine one or more clusters by separating each classification of the second outputs based on a threshold confidence score, wherein confidence scores of a first cluster of the one or more clusters are below the threshold confidence score and confidence scores of a second cluster of the one or more clusters are above the threshold confidence score. In some embodiments, the computing system may determine clusters using one or more machine learning models. For example, the computing system may use K-means, means-shift, density-based spatial clustering of applications with noise (DBSCAN), or a variety of other clustering techniques to determine clusters.

By clustering output of the surrogate machine learning model, the computing system may be able to determine whether the surrogate machine learning model is able to make accurate classifications for one or more samples. The computing system may then determine whether the production machine learning model is treating those one or more samples differently from other samples that the surrogate machine learning model is unable to accurately classify. If the production machine learning model is treating those one or more samples differently, the computing system may determine that the production model is biased and may modify output of the production model to counteract the bias as explained in more detail below.

At step 410, the computing system may detect that the production model treats different subpopulations differently based on the clusters. In some embodiments, the computing system may detect different treatment based on correlation (e.g., unintended correlation) of output associated with one or more clusters. For example, the computing system may perform clustering based on confidence scores of the surrogate outputs to determine one or more clusters indicating a threshold-exceeding correlation between (i) a respective label of the surrogate set of labels, (ii) a respective label of the production set of labels, and (iii) one or more respective feature values of features of the production inputs. In one example, the computing system may determine that there is a high correlation between being rejected for a banking product and being a member of a cluster for which the surrogate machine learning model has higher than a threshold confidence score for classifying as belonging to one or more demographics. The correlation may indicate bias in the production machine learning model. The bias may be associated with the set of labels used to replace the labels used in training the production machine learning model.

In some embodiments, the computing system may determine that the production machine learning model is providing different treatment (e.g., different output) to different subpopulations based on detecting an anomalous cluster of the clusters generated in step 408. The computing system may detect, based on the plurality of clusters and via an anomaly detection model, an anomalous cluster of the plurality of clusters, wherein the anomalous cluster indicates bias in the production machine learning model, the bias being associated with the feature not present in the production dataset. In one example, detecting an anomalous cluster may include determining that the production machine learning model outputs more than a threshold number of classifications of a first type for the first cluster and outputs fewer than the threshold number of classifications of the first type for the second cluster; and based on the production machine learning model outputting more than the threshold number of classifications of the first type for the first cluster and outputting fewer than the threshold number of classifications of the first type for the second cluster, determining that the first cluster is anomalous. Detecting an anomalous cluster may indicate that any members or users associated with the anomalous cluster are being treated differently by the production machine learning model. By detecting an anomalous cluster, the computing system may be able to determine that output of the production model (e.g., for other samples that may be members of the cluster) should be modified. By doing so, the computing system may be able to provide more consistent output, which may improve the functioning of the computing system by providing more predictable outcomes.

In one example, the computing system may determine whether subpopulations (e.g., of user devices) are treated differently based on their geographic location. For example, the computing system may determine whether communications from particular regions are flagged as anomalous (e.g., due to fraud, cybersecurity incidents, etc.) more often than communications from other regions. In this example, a first set of labels used by the production machine learning model may indicate whether an anomaly has been detected, a second set of labels used by the surrogate machine learning model may indicate locations of computing devices, and the surrogate machine learning model may be trained to determine a location of a computing device. In one example, the surrogate dataset used to train the surrogate machine learning model may include output generated via the first model, and the output generated by the second machine learning model comprises a counterfactual sample corresponding to the output generated via the first model.

At step 412, the computing system may modify output generated by the production machine learning model. For example, the computing system may generate, based on the one or more clusters, an indication of a modification related to the first machine learning model. In some embodiments, the computing system may modify output generated by the production machine learning model to counteract potential bias of the production machine learning model. For example, the computing system may determine that a user is associated with a demographic that has been denied banking products via the production machine learning model (e.g., based on the user belonging to a cluster that has been determined to be anomalous, based on the user belonging to a cluster that has been determined to be treated differently by the production machine learning model as compared to users belonging to other clusters, etc.).

At step 414, the computing system may send an indication of the modified output to a user device. For example, the computing system may send the modified output to a user that has been approved for a banking product. Additionally or alternatively, the computing system may send an indication of the modified output to a user device that is used to monitor output of the machine learning model.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: obtaining (i) first inputs provided to a first machine learning model and (ii) first outputs generated via the first machine learning model based on the first inputs, the first machine learning model being trained to classify an input with a respective label of a first set of labels; accessing a second machine learning model trained on a surrogate dataset comprising a second set of labels in lieu of the first set of labels, the second machine learning model being trained to classify an input with a respective label of the second set of labels; providing, to the second machine learning model, the first inputs to obtain second outputs corresponding to the first outputs, each second output of the second outputs comprising a respective classification corresponding to the second set of labels; determining one or more clusters indicating a correlation between (i) a respective label of the second set of labels, (ii) a respective label of the first set of labels, and (iii) one or more respective feature values of features of the first inputs; and generating, based on the one or more clusters, an indication of a modification related to the first machine learning model.

2. The method of any of the preceding embodiments, wherein determining one or more clusters comprises: separating each classification of the second outputs based on a threshold confidence score, wherein confidence scores of a first cluster of the one or more clusters are below the threshold confidence score and confidence scores of a second cluster of the one or more clusters are above the threshold confidence score.

3. The method of any of the preceding embodiments, further comprising: determining that the first machine learning model outputs more than a threshold number of classifications of a first type for the first cluster and outputs fewer than the threshold number of classifications of the first type for the second cluster; and based on the first machine learning model outputting more than the threshold number of classifications of the first type for the first cluster and outputting fewer than the threshold number of classifications of the first type for the second cluster, determining that the first cluster is anomalous.

4. The method of any of the preceding embodiments, wherein determining the one or more clusters comprises: inputting the output of the second machine learning model into a clustering model and determining, via the clustering model, the one or more clusters.

5. The method of any of the preceding embodiments, wherein the correlation indicates bias in the first machine learning model, the bias being associated with the second set of labels, wherein the second set of labels is not in the first inputs.

6. The method of any of the preceding embodiments, wherein generating the indication of a modification related to the first machine learning model comprises: modifying output of the first machine learning model such that the bias is no longer present in the output.

7. The method of any of the preceding embodiments, further comprising: generating a user interface for displaying an indication of the modification and output generated by the first machine learning model and causing display of the user interface.

8. The method of any of the preceding embodiments, wherein a confidence score associated with the second outputs indicates a level of certainty that a corresponding classification is correct.

9. The method of any of the preceding embodiments, wherein the first set of labels indicates whether an anomaly has been detected, the second set of labels indicates locations of computing devices, and wherein the second machine learning model is trained to determine a location of a computing device.

10. The method of any of the preceding embodiments, wherein the surrogate dataset further comprises output generated via the first model, and wherein the output generated by the second machine learning model comprises a counterfactual sample corresponding to the output generated via the first model.

11. The method of any of the preceding embodiments, wherein the machine learning model comprises a neural network model or a linear regression model.

12. A tangible, non-transitory, machine-readable medium storing instructions that, when executed by a data processing apparatus, cause the data processing apparatus to perform operations comprising those of any of embodiments 1-11.

13. A system comprising one or more processors; and memory-storing instructions that, when executed by the processors, cause the processors to effectuate operations comprising those of any of embodiments 1-11.

14. A system comprising means for performing any of embodiments 1-11.

What is claimed is:

1. A system for using a surrogate machine learning model to detect and remove bias in output generated by a production machine learning model, the system comprising:

one or more processors and one or more non-transitory, computer-readable media having instructions recorded thereon that, when executed by the one or more processors, cause operations comprising:

generating a surrogate dataset for training a surrogate machine learning model such that: (i) the surrogate dataset is a modified version of a production training dataset used to train a production machine learning model to classify an input with a respective label of a production set of labels included in the production training dataset; and (ii) the surrogate dataset comprises a surrogate set of labels in lieu of the production set of labels of the production training dataset;

using the surrogate dataset to train the surrogate machine learning model to classify an input with a respective label of the surrogate set of labels;

obtaining production inputs and production outputs of the production machine learning model, each production output of the production outputs comprising a respective label of the production set of labels that was generated via the production machine learning model in response to providing the production machine learning model with a corresponding production input of the production inputs;

providing, to the surrogate machine learning model trained on the surrogate dataset, the production inputs to obtain surrogate outputs corresponding to the production outputs, each surrogate output of the surrogate outputs comprising (i) a respective surrogate label of the surrogate set of labels and (ii) a confidence score for the respective surrogate label;

performing clustering based on confidence scores of the surrogate outputs to determine one or more clusters indicating a threshold-exceeding correlation between (i) a respective label of the surrogate set of labels, (ii) a respective label of the production set of labels, and (iii) one or more respective feature values of features of the production inputs; and generating, based on the one or more clusters, an indication of a modification related to the production machine learning model.

2. A method comprising:

obtaining (i) first inputs provided to a first machine learning model and (ii) first outputs generated via the first machine learning model based on the first inputs, the first machine learning model being trained to classify an input with a respective label of a first set of labels;

accessing a second machine learning model trained on a surrogate dataset comprising a second set of labels in lieu of the first set of labels, the second machine learning model being trained to classify an input with a respective label of the second set of labels;

providing, to the second machine learning model, the first inputs to obtain second outputs corresponding to the first outputs, each second output of the second outputs comprising a respective classification corresponding to the second set of labels;

determining one or more clusters indicating a correlation between (i) a respective label of the second set of labels, (ii) a respective label of the first set of labels, and (iii) one or more respective feature values of features of the first inputs; and generating, based on the one or more clusters, an indication of a modification related to the first machine learning model.

3. The method of claim 2, wherein determining the one or more clusters comprises:

separating each classification of the second outputs based on a threshold confidence score, wherein confidence scores of a first cluster of the one or more clusters are below the threshold confidence score and confidence scores of a second cluster of the one or more clusters are above the threshold confidence score.

4. The method of claim 3, further comprising:

determining that the first machine learning model outputs more than a threshold number of classifications of a first type for the first cluster and outputs fewer than the threshold number of classifications of the first type for the second cluster; and based on the first machine learning model outputting more than the threshold number of classifications of the first type for the first cluster and outputting fewer than the threshold number of classifications of the first type for the second cluster, determining that the first cluster is anomalous.

5. The method of claim 2, wherein determining the one or more clusters comprises:

inputting the second outputs of the second machine learning model into a clustering model; and determining, via the clustering model, the one or more clusters.

6. The method of claim 2, wherein the correlation indicates bias in the first machine learning model, the bias being associated with the second set of labels.

7. The method of claim 6, wherein generating the indication of the modification related to the first machine learning model comprises:

modifying output of the first machine learning model such that the bias is no longer present in the output.

8. The method of claim 2, further comprising:

generating a user interface for displaying the indication of the modification and output generated by the first machine learning model; and causing display of the user interface.

9. The method of claim 2, wherein a confidence score associated with the second outputs indicates a level of certainty that a corresponding classification is correct.

10. The method of claim 2, wherein the first set of labels indicates whether an anomaly has been detected, the second set of labels indicates locations of computing devices, and wherein the second machine learning model is trained to determine a location of a computing device.

11. The method of claim 2, wherein the surrogate dataset further comprises output generated via the first machine learning model, and wherein the output generated by the second machine learning model comprises a counterfactual sample corresponding to the output generated via the first machine learning model.

12. One or more non-transitory, computer-readable media comprising instructions that, when executed by one or more processors, cause operations comprising:

obtaining (i) first inputs provided to a first machine learning model and (ii) first outputs generated via the first machine learning model based on the first inputs, the first machine learning model being trained to classify an input with a respective label of a first set of labels;

accessing a second machine learning model trained on a surrogate dataset comprising a second set of labels in lieu of the first set of labels, the second machine learning model being trained to classify an input with a respective label of the second set of labels;

providing, to the second machine learning model, the first inputs to obtain second outputs corresponding to the first outputs, each second output of the second outputs comprising a respective classification corresponding to the second set of labels;

determining one or more clusters indicating a correlation between (i) a respective label of the second set of labels, (ii) a respective label of the first set of labels, and (iii) one or more respective feature values of features of the first inputs; and generating, based on the one or more clusters, an indication of a modification related to the first machine learning model.

13. The media of claim 12, wherein determining the one or more clusters comprises:

separating each classification of the second outputs based on a threshold confidence score, wherein confidence scores of a first cluster of the one or more clusters are below the threshold confidence score and confidence scores of a second cluster of the one or more clusters are above the threshold confidence score.

14. The media of claim 13, wherein the instructions, when executed, cause operations further comprising:

determining that the first machine learning model outputs more than a threshold number of classifications of a first type for the first cluster and outputs fewer than the threshold number of classifications of the first type for the second cluster; and based on the first machine learning model outputting more than the threshold number of classifications of the first type for the first cluster and outputting fewer than the threshold number of classifications of the first type for the second cluster, determining that the first cluster is anomalous.

15. The media of claim 12, wherein determining the one or more clusters comprises:

inputting the second outputs of the second machine learning model into a clustering model; and determining, via the clustering model, the one or more clusters.

16. The media of claim 12, wherein the correlation indicates bias in the first machine learning model, the bias being associated with the second set of labels.

17. The media of claim 16, wherein generating the indication of the modification related to the first machine learning model comprises:

modifying output of the first machine learning model such that the bias is no longer present in the output.

18. The media of claim 12, wherein the instructions, when executed, cause operations further comprising:

generating a user interface for displaying the indication of the modification and output generated by the first machine learning model; and causing display of the user interface.

19. The media of claim 12, wherein a confidence score associated with the second outputs indicates a level of certainty that a corresponding classification is correct.

20. The media of claim 12, wherein the first set of labels indicates whether an anomaly has been detected, the second set of labels indicates locations of computing devices, and wherein the second machine learning model is trained to determine a location of a computing device.

* * * * *